United States Patent [19]

Geisler

[11] Patent Number: 5,442,942
[45] Date of Patent: Aug. 22, 1995

[54] AUTOMOTIVE ANTI-THEFT PROTECTION APPARATUS

[76] Inventor: Bruce T. Geisler, 1330 N. 14th St., Apt. V25, Whitehall, Pa. 18052

[21] Appl. No.: 104,914

[22] Filed: Aug. 12, 1993

[51] Int. Cl.⁶ .............................................. B60R 25/02
[52] U.S. Cl. ........................................ 70/209; 70/226; 70/238; 74/552
[58] Field of Search .................. 74/552, 558; 70/207, 70/209–212, 225, 226, 237, 238, 258, 259, 416, 417

[56] References Cited

U.S. PATENT DOCUMENTS

| | | | |
|---|---|---|---|
| 3,190,090 | 6/1965 | Ziadener | 70/203 |
| 3,815,391 | 6/1974 | Latta | 70/209 |
| 3,884,092 | 5/1975 | Raudebaugh | 74/558 |
| 4,103,524 | 8/1978 | Mitchell et al. | 70/209 |
| 4,304,110 | 12/1981 | Fain | 70/209 |
| 4,432,432 | 2/1984 | Martin | 180/287 |
| 4,444,030 | 4/1984 | Dausch | 70/209 |
| 4,699,238 | 10/1987 | Tamir | 180/287 |
| 4,738,127 | 4/1988 | Johnson | 70/209 |
| 4,750,341 | 6/1988 | Laguna | 70/209 |
| 4,876,867 | 10/1989 | Leneave | 70/209 X |
| 4,882,920 | 11/1989 | Wu | 70/209 |
| 4,887,484 | 12/1989 | Peng | 74/552 X |
| 4,961,331 | 10/1990 | Winner | 70/209 |
| 4,982,810 | 1/1991 | Toy | 180/287 |
| 5,007,259 | 4/1991 | Mellard | 70/209 |
| 5,024,069 | 6/1991 | Hull, Jr. et al. | 70/209 |
| 5,031,429 | 7/1991 | Wang | 70/209 |
| 5,055,823 | 10/1991 | Fuller | 70/226 X |
| 5,128,649 | 7/1992 | Elmer | 70/226 X |
| 5,157,951 | 10/1992 | Chen et al. | 70/226 X |
| 5,197,309 | 3/1993 | Del Rosario | 70/209 |
| 5,230,232 | 7/1993 | Yang | 70/226 X |
| 5,275,030 | 1/1994 | Cole | 70/226 X |
| 5,381,679 | 1/1995 | Cummins | 70/209 |

FOREIGN PATENT DOCUMENTS

| | | | |
|---|---|---|---|
| 2580243 | 10/1986 | France | 70/209 |
| 631708 | 6/1936 | Germany | 70/209 |
| 2134057 | 8/1984 | United Kingdom | 70/209 |
| 9004211 | 3/1992 | WIPO | 70/238 |

Primary Examiner—Peter M. Cuomo
Assistant Examiner—Suzanne L. Dino
Attorney, Agent, or Firm—Sanford J. Piltch

[57] ABSTRACT

A steering wheel having a built-in, anti-theft protection means is disclosed. The steering wheel is provided with two positions; a standard position used for the normal steering of the vehicle and an anti-theft position, wherein the lower and upper sections of the steering wheel are almost completely separated from each other thereby substantially rendering the steering wheel inoperative. The lower section has a first end with a releasable unit housed therein and a second end with a lockable unit housed therein. The upper section has a first end with a cavity for receiving the releasable unit and a second end with a head member for receiving the lockable unit. The second end of the upper section also has a device used for capturing the second end of the lower section while still allowing rotation therebetween when the locking unit is not in its locked position.

6 Claims, 2 Drawing Sheets

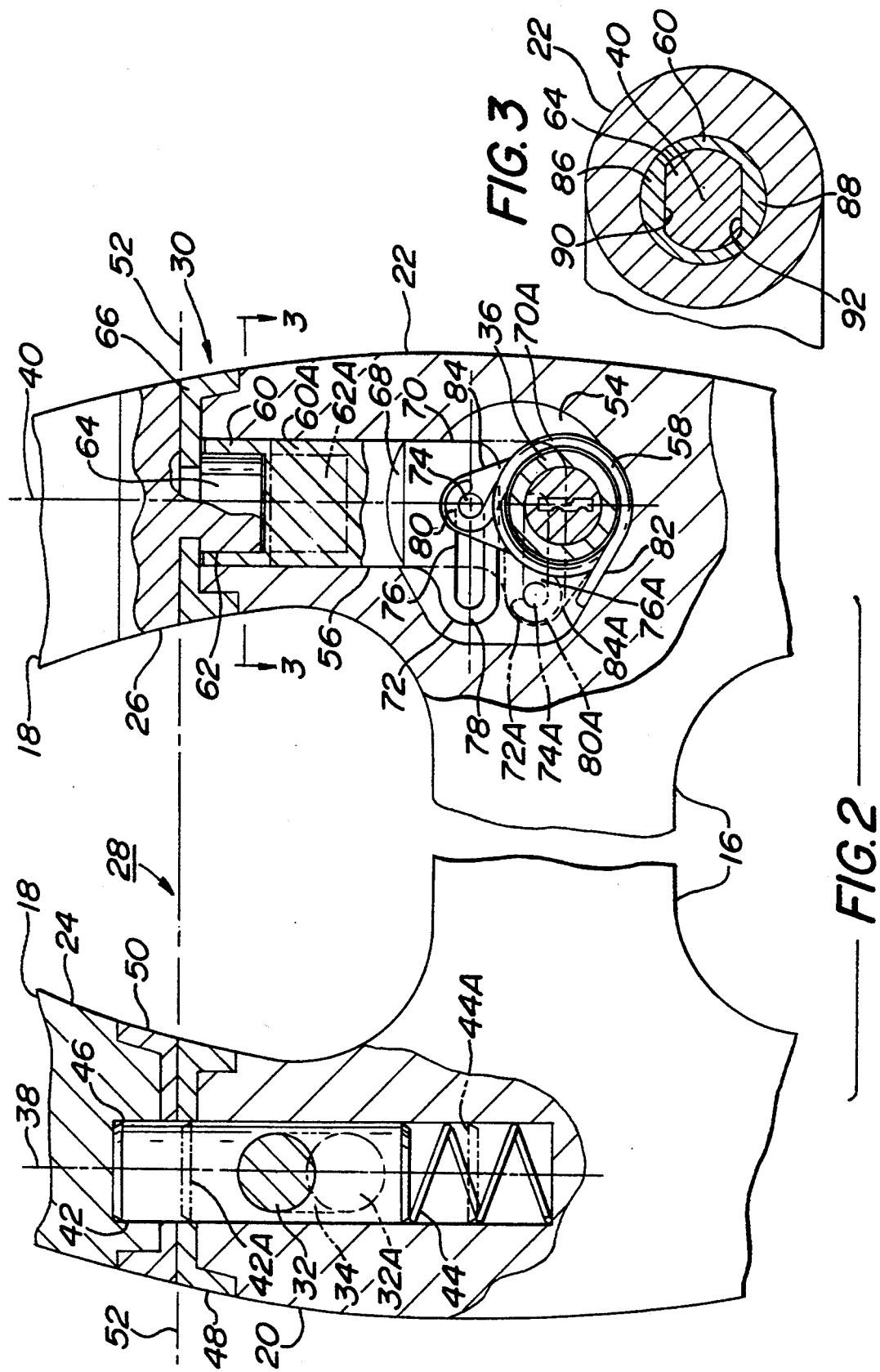

AUTOMOTIVE ANTI-THEFT PROTECTION APPARATUS

FIELD OF THE INVENTION

The present invention relates to anti-theft devices for automobiles, and more particularly, to a steering wheel having a built-in, anti-theft device which prevents complete rotation of the wheel.

BACKGROUND OF THE INVENTION

Anti-theft devices are well known and include electronic devices, such as alarms which directly disable the engine or ignition unless bypassed by an authorized operator using with a special key or electronic code. In addition to being relatively expensive, these electronic devices, because of their relatively high sensitivity, sometimes cause erroneous alarms to occur due to their response to unintentional physical force or movement. Furthermore, these electronic devices are susceptible to the owner's own forgetful habits. Consequently, such alarms are frequently activated accidentally by persons, such as parking lot or service station attendants, passengers seeking entry into the vehicle, or the owners themselves that neglect to disable the alarm before entry into the vehicle.

Non-electronic, anti-theft devices are also well known and may be of the type that interlock the steering wheel with another operator control mechanism, such as a brake pedal, or with an interior portion of the vehicle. Some of such devices are described in U.S. Pat. Nos. 3,190,090 (Zaidener); 4,432,432 (Martin); 4,699,238 (Tamir); and 4,961,331 (Winner). These mechanical devices, because of their awkward shapes and lengths, are somewhat difficult to use and are time consuming to be put into place, especially, while being seated behind the steering wheel. Furthermore, some of these devices are relatively large and must be stored in the vehicle's trunk, thereby, preventing the device from being readily available for installation.

Another group of non-electronic, anti-theft devices that can be attached to a steering wheel are disclosed in U.S. Pat. Nos. 4,103,524 (Mitchell, et al); 4,304,110 (Fain); 4,738,127 (Johnson); and 5,024,069 (Hull, Jr., et al). These devices have one or more appendages that project outward from the steering wheel thereby preventing its complete or full operational rotation. Not all of these devices are compact enough to allow them to be conveniently stored in the vehicle's passenger compartment, and even those that are compact are normally kept under the front seat where the devices are sometimes exposed to dirt and water. During their usage, these devices undesirably transfer the stored dirt and water to the person retrieving and installing the device or onto the steering wheel where the devices are attached. Furthermore, even when installed, visual gaps exist along various locations between the device itself and the steering wheel which give the appearance, to a potential thief, as insertion slots for a wedging device, such as a pry bar. For such situations, substantial damage to the vehicle, especially, the steering wheel could result, even though the thief is unsuccessful in his or her attempt to pry the device from the steering wheel.

Anti-theft devices that are built-in or incorporated into a steering wheel are also known and one such is described in U.S. Pat. No. 5,031,429 (Wang). The Wang patent discloses a steering wheel that encloses a recess track, located behind and under the steering wheel, having a sliding steel rod therein that can be extended outward and then locked in place to restrict movement of the steering wheel. This anti-theft device, because of its location, may obstruct the path for the deployment of an Air Bag Supplemental Restraining System (ABSRS). Furthermore, this anti-theft device, because of its location, must be taken into account to preserve the safety features of the energy-absorbing steering column commonly found in automobiles.

A further anti-theft device is disclosed in U.S. Pat. No. 4,982,810 (Toy) and comprises a gripping member which clamps around a steering wheel and prevents any rotation thereof. The gripping member is attached to an end of a telescoping steel bar which is retractable into the vehicle's dashboard when not in use. This anti-theft device suffers a drawback in that it must be integrated into the design of the vehicle's dashboard and may even necessitate the need to relocate some of the instrument gauges of the dashboard into locations that are undesired from an operator's viewing position.

The prior art seems to suffer from the drawbacks of having anti-theft devices that are not readily available, those that may interfere with the Air Bag Supplemental Restraining System, those that may have an undesired impact on an energy-absorbing steering column, and those that may even necessitate an undesired dashboard arrangement for the vehicle. It is desired to provide an anti-theft device that does not suffer from these prior art drawbacks.

Accordingly, it is an object of the present invention to provide a steering wheel having a built-in anti-theft device which prevents complete, or even partial, rotation of the steering wheel so as to inhibit unauthorized operation of the vehicle.

A further object of the present invention is to provide an anti-theft device that is incorporated into the steering wheel and does not necessitate any modification to automotive components, such as the dashboard, located within the vehicle's interior.

Another object of the present invention is to provide an anti-theft device which is highly visible and conspicuous to an observor outside of the vehicle to thereby create a significant deterrent to prevent either break-in or theft of the vehicle.

It is still further an object of the present invention to provide an anti-theft device that is built into the steering wheel and does not impact on any of the safety features of an energy absorbing steering column or on an Air Bag Supplemental Restraining System.

Still further, another object of the present invention is to provide an anti-theft device for automobiles that works well with already existing anti-theft protection, such as electronic alarm security systems and ignition key interlocked steering wheels.

SUMMARY OF THE INVENTION

This invention is directed to a steering wheel having a built-in anti-theft device that inhibits complete, and even partial, rotation thereof so as to prevent any unauthorized operation of the vehicle.

The steering wheel comprises a lower section and an upper section with the lower section having a first end with releasable means housed therein and a second end with lockable means housed therein. The upper section has a first end with means for receiving the releasable means and a second end with means for receiving the lockable means. The second end of the upper section also has means for capturing the second end of the lower section, but allowing rotation therebetween when the lockable means is not received by the second end of the upper section.

Other objects, advantages and novel features of the present invention will become apparent from the following detailed description of the invention when considered in conjunction with the accompanying drawings.

BRIEF DESCRIPTION OF THE DRAWINGS

For the purpose of illustrating the invention, there is shown in the drawings a form which is presently preferred; it being understood, however, this invention is not limited to the precise arrangements and instrumentalities shown.

FIG. 2 illustrates details of the releasable means and lockable means of the steering wheel of FIG. 1.

FIG. 3 is a view, taken along the line 3—3 of FIG. 2, showing further details of the lockable means of FIG. 2.

DETAILED DESCRIPTION OF THE PREFERRED EMBODIMENTS

Figure 1:
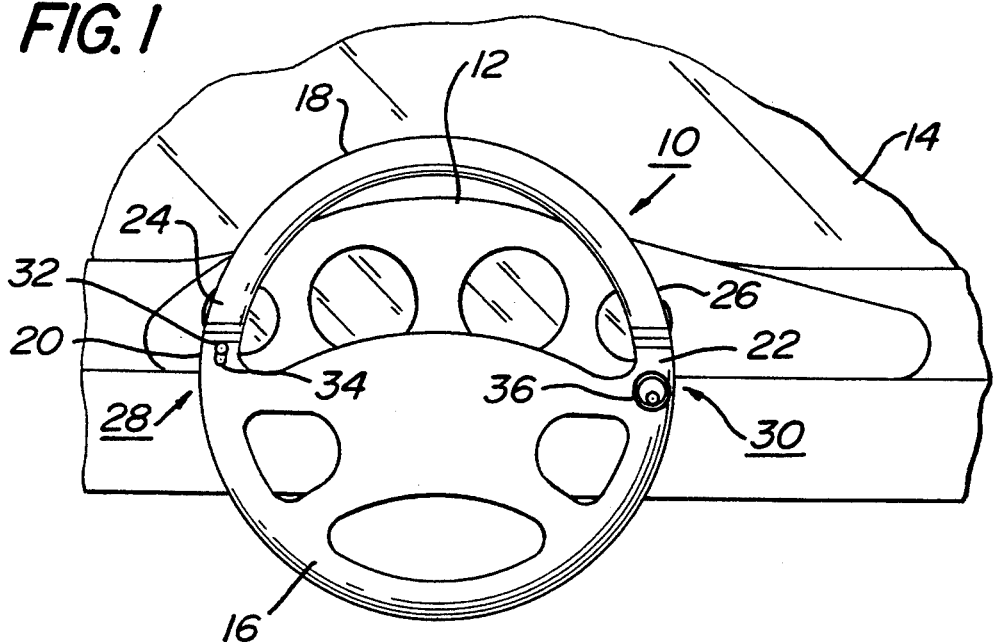
FIG. 1 is a pictorial view showing the steering wheel of the present invention in its standard position ready for use within the interior of a vehicle.

Referring now to the drawings, wherein the same reference numbers are used to indicate the same elements, there is shown in FIG. 1 a vehicle steering wheel 10 of the present invention. In general, the steering wheel 10 has a built-in, anti-theft means which allows the steering wheel to be configured in its standard ready-for-use position as shown in FIG. 1 or in its non-operative position (shown in FIG. 4 to be described) which in one embodiment prevents the steering wheel 10 from being completely rotated during its operation and in other embodiments limits the angular distance that the steering wheel 10 can be moved before it contacts an interior portion of the vehicle.

The steering wheel 10 is located in the general region of the instrument panel 12 and facing the windshield 14. The steering wheel 10 comprises a lower section 16 and an upper section 18 both preferably having a semi-circular shape. The lower section 16, at its upper regions, has a first end 20 and a second end 22 which are oppositely disposed from each other, whereas the upper section 18, at its lower regions, has a first end 24 and a second end 26 which are also oppositely disposed from each other. The ends 20 and 22 respectively mate with ends 24 and 26. The lower section 16 has releasable means 28 housed in its first end 20, and a lockable means 30 housed in its second end 22. The releasable means 28 comprises a stud 32 that is movable within an oblong opening 34, whereas the lockable means 30 comprises a lockable device 36 which is preferably key operated and has a pin-tumbler cylinder. The lockable means 30 and the releasable means 28 may both be further described with reference to FIG. 2.

FIG. 2 illustrates, partially in section and partially cut away, the releasable means 28 and the lockable means 30 as having axes 38 and 40 respectively. The releasable means 28 comprises a bolt member 42, having a pre-determined diameter, and the stud 32 connected thereto and preferably forming an integral part thereof. The stud 32 outwardly protrudes through the oblong opening 34 and has dimensions that are selected so that its exposed end is capable of being grasped by an operator and then depressed downward. The releasable means 28 further comprises a biasing spring 44 upon which the bolt member 42 rides. The bolt member 42 is received by a cavity 46 placed in the end 24 of the upper section 18.

The cavity 46 is selected to have dimensions slightly greater than the pre-determined diameter of the bolt member 42 so that the bolt 42 may be easily received therein and exit therefrom. The bolt member 42 enters and exits the cavity 46 by way of a passageway defined by openings in retention plates 48 and 50. The retention plates 48 and 50 are rigidly affixed to the first ends 20 and 24, respectively, by appropriate means, such as being press fitted. The mating surfaces between retaining plates 48 and 50 define a horizontal plane 52 which, as shown in FIG. 2, also corresponds to the plane of the mating surfaces of ends 22 and 26 associated with to the lockable means 30.

The releasable means 28 has two operating positions: the first causing the ends 20 and 24 to be held together and the second allowing the ends 20 and 24 to be separated. The ends 20 and 24 are held together by the bolt member 42 being placed inside the cavity 46, whereas the ends 20 and 24 are allowed to be separated by a downward pressure being applied to the stud 32 causing the bolt member 42 to be withdrawn from the cavity 46.

The two different positions are indicated in FIG. 2 by the use of solid and phantom representations and similar reference numbers differentiated from each other by a letter A. More particularly, the first position is illustrated by a solid representation of elements 32, 42 and 44 (all in their upper positions), whereas the second position is illustated by the phantom representation of elements 32A, 42A, and 44A (all in their lower positions). The lockable means 30, shown on the right side of FIG. 2, also has two positions.

The lockable means 30 comprises a hollow 54, a locking shaft 56, the lockable device 36, and a coil spring 58. The hollow 54 is formed in the second end 22 of the lower section 16 and has an upper section to guide locking shaft 56 and a lower section contoured to allow for the movement of locking shaft 56, spring 58 and the lockable device 36. The locking shaft 56 rides in the hollow 54 and has an upper portion with sidewalls 60 which define a cavity 62. As will be further described with reference to FIG. 3, the dimensions for cavity 62 and sidewalls 60 are selected to conform to but be slightly larger than those of head member 64 which has a pre-determined shape.

The head member 64 is affixed to a retention plate 66 and both are rigidly attached to end 26 of the upper section 18. More specifically, the retention plate 66, carrying head member 64, is pressed fitted or otherwise rigidly and permanently affixed to the end 26, so that when end 26 is rotated, as to be described hereinafter, the head member 64 follows along. The retention plate 66 in cooperating with head member 64 serves as the means for interlocking ends 22 and 24 but allowing rotation therebetween when the lockable means 30 is in its retracted position.

The locking shaft 56 of lockable means 30 has a sloped portion 68, a lower heel portion 70, a lower toe portion 72, and a pin 74 which rides in a channel 76 having a center line 78. The pin 74 is captured by a hooked portion 80 of one end of the coil spring 58. The coil spring 58 has its other end 82 braced against a wall of the cavity 54 while its remaining portion is wrapped around the lockable device 36. The lockable device 36 has a rotatable shaft (not shown) which has at one of its ends a cam member 84 having a peak shape. The cam member 84 has an opening which accepts the pin 74 and is also attached to the pin 74 by means of the spring action of the mating hooked portion 80.

The lockable means 30 has an engaged and a retracted position and wherein the engaged position may be further described with reference to FIG. 3. FIG. 3 illustrates that the sidewalls 60 completely surround the head member 64. More particularly, as seen in FIG. 3, the sidewalls 60 have diametrically opposed sides 86 and 88 each having an inner straight wall that is aligned with respective straight edge portions 90 and 92 of the head member 64. Thus, when these elements are engaged, any substantial relative movement between the head member 64 and the sidewalls 60 is prevented. As discussed with regard to FIG. 2, head member 64 is considered to be a part of end 26 and sidewalls 60 are considered to be part of end 22 so that the engaging and confining interface between head member 64 and sidewall 60 establishes a fixed orientation between ends 22 and 26. However, sidewalls 60 are retractable from the head member 64 and such retraction may be further described with reference back to FIG. 2.

In operation, when a key (not shown) is inserted into lockable device 36 and turned counterclockwise it causes the cam member 84 to also rotate counterclockwise as indicated by arrow 94. Such rotation causes the pin 74 to move inward (as viewed in FIG. 2) within the channel 76 and also to drag the locking shaft 56 downward. The movement of pin 74 within channel 76 eases the counterclockwise downward movement of cam 84. The downward movement of locking shaft 56 causes the sidewalls 60 to begin being downwardly retracted from head member 64. The downward retraction of the sidewalls 60 is continued until sidewalls 60 are free of any contact with the head member 64 so that the head member 64 may now be freely moved or rotated.

In a manner similar to releasable means 28, the initial (engaged) and final (retracted) positions of the locking shaft 56 are indicated by the use of solid and phantom representations and by the use of similar reference numbers differentiated from each other by the letter A. More particularly, the upward engaged first position of locking shaft 56 is indicated by the solid representations of elements 60, 62, 70, 72, 74, 76, 80 and 84 and the second position of the downward movement of the locking shaft 56 is indicated by the phantom representation of element 60a, 62a, 70a, 72a, 74a, 76a, 80a, and 84a.

It should now be appreciated that the lockable means 30 has two operating positions; the first being a locked stationary position between ends 22 and 26, and the second being an unlocked position in which the ends 22 and 26 are free to rotate relative to each other. The stationary position of ends 22 and 26 may be further described with reference back to FIG. 1.

As seen in FIG. 1, the steering wheel 10 is in its stationary, standard, ready-for-use position. More particularly, the lower section 16 (having ends 20 and 22) and upper section 18 (having ends 24 and 26) are interconnected allowing a driver to maneuver a vehicle which is normally accomplished by holding the steering wheel 10 at a position with his left hand corresponding to a ten o'clock location and with his right hand at a position corresponding to two o'clock location. Needless to say, if the steering wheel 10 is reconfigured from its standard position and is given the appearance of being separated or broken apart, then an observer from the outside of the vehicle, in particular, a thief will be deterred from even attempting to enter the vehicle, much less stealing the vehicle. Such a broken-part appearance is illustrated in FIG. 4.

Figure 4:
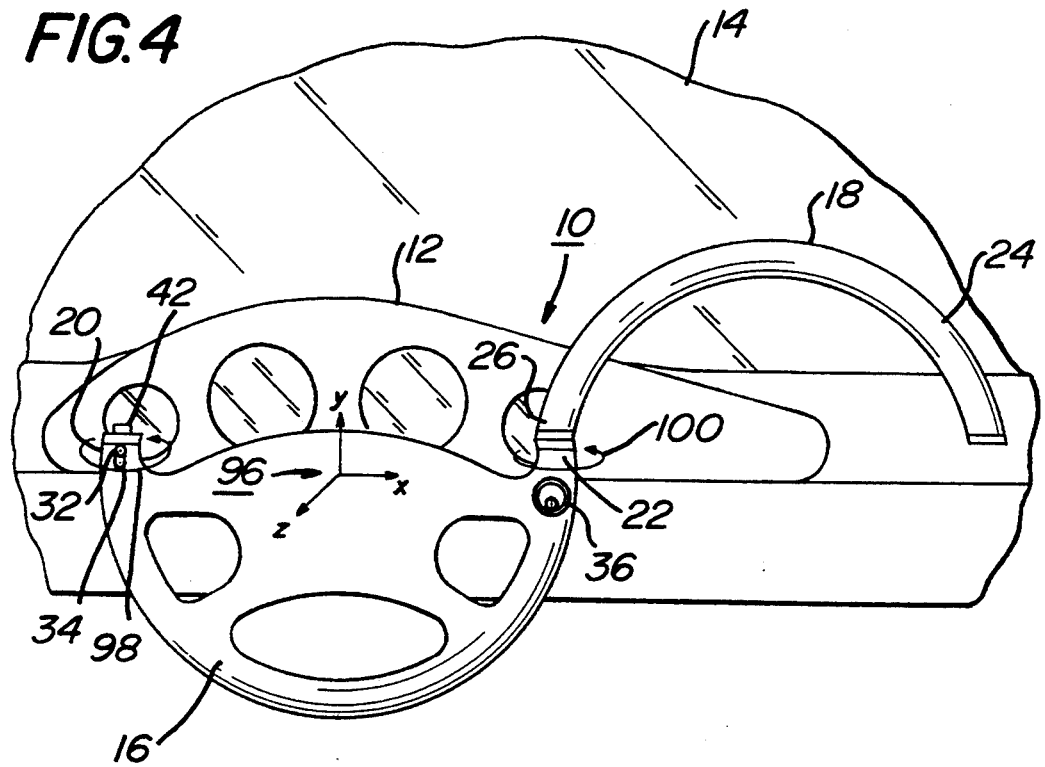
FIG. 4 is a pictorial view showing the steering wheel of the present invention in its anti-theft position within the interior of a vehicle.

FIG. 4 illustrates the upper section 18 as having its first end 24 disconnected from the first end 20 and with the end 24 rotated 180° relative to end 22. FIG. 4 further illustrates and X-Y-Z orientation 96, wherein the Z axis extends out of the paper. To obtain the orientation of the upper section 18 shown in FIG. 4, an operator need only insert a key into the lockable device 36 and unlock end 26 from end 22, and then need only depress the stud 32 downward so as to release the engagement between ends 20 and 24. The operator need now only grasp end 24 and push end 24 so that it rotates outward, as shown by directional arrow 98, so that end 24 extends into the plane of the Z axis in a counterclockwise direction and continues such movement for about 180° relative to end 22, as shown by directional arrow 100, thereby allowing end 24 to obtain its final position shown in FIG. 4. After such rotation the operator need only now operate the key of the lockable device 36 so that the end 24 is fixed in this 180° position relative to ends 22 and 26. The obtainment of this locked 180° position may be further described with reference back to FIG. 3.

As previously discussed, the head member 64 of FIG. 3 is rigidly attached to the end 26 of the upper section 18. Accordingly, after the sidewalls 60 are retracted from around head member 64, and after the end member 26 is rotated 180° in the Z plane, the position of its straight edge portions 90 and 92 are interchanged; i.e., the straight edge portion 90 is rotated from its top position (as viewed in FIG. 3) into the lower position previously occupied by the straight edge portion 92 and, conversely, the lower straight edge portion 92 is rotated into the upper position previously occupied by the straight edge portion 90. Further, it should be noted that straight edge portions 90 and 92 are contoured so as to be complementary with either of the opposite sides 86 and 88 of the sidewalls 60. Accordingly, after the 180° rotation of end 26 (discussed with reference to FIG. 4), when the lockable device 36 is activated, the sidewalls 60 move upward and conform to and capture the head member 64, thereby, providing the locking position of the steering wheel 10 shown in FIG. 4.

From FIG. 3 it should be realized that the preselected shape of the head member 64 and the shape of the sidewalls 60 may be selected so that the upper section 18, i.e., end 24, may be oriented in any pre-determined manner. The straight edge portions 90 and 92 cooperate with the opposite sides 86 and 88 to provide any stop-lock mechanism that may be desired. For example, the straight edge portions 90 and 92 and the opposite sides 86 and 88 may be disposed 90° from each other, so that when the head member 64 is rotated 90° (with the sidewalls 60 retracted) head member 64 will be provided with a locked position thereat. For such a locked 90° position, the end 24 of the upper section 18 would extend outward into the Z axis and toward the normal sitting position of the driver. Further orientations may be provided so that the end 24 may be rotated into a position so that it contacts the dashboard 12 of an automobile thereby preventing any movement whatsoever of the steering wheel 10. Still further, the pre-determined orientation of the rotatable end 24 may be arranged so that end 24 comes into abutting contact with a rod (not shown) that is retractable from the dashboard of the vehicle, thereby, preventing any further angular rotation of the steering wheel 10.

It should now be appreciated that the practice of the present invention provides a steering wheel having a built-in, anti-theft device which prevents complete or even partial rotation without contacting an interior portion of a vehicle and, thereby, rendering the steering wheel inoperative for steering the vehicle.

Although the invention has described the upper section 18 (end 24) as swinging outward along into the Z axis so that it reoritented; e.g., 180°, it should be appreciated that the practice of this invention contemplates that this upper section could be pivoted upward to obtain a desired orientation for its locked position. Furthermore, embodiments of the releasable means 28 and the lockable means 30 other than those shown in detail in FIG. 2 are contemplated by the practice of the present invention. For example, the releasable means 28 may be a pinned arrangement for releasable holding the ends 20 and 24 together. Similarly, the lockable means 30 could be a bolt action mechanism that is allowed to be moved by the operation of a key and which movement is into and out of a corresponding cavity in an up-down, vertical manner. Further, the locking mechanism is contemplated to be of any presently known and used variety which lends itself to the operation described, which can include keyways of different configurations or combination-type lock mechanisms, and any later discovered mechanism or apparatus which performs substantially the same function.

The present invention may be embodied in other specific forms without departing from the spirit or essential attributes thereof and, accordingly, reference should be made to the appended claims rather than to the foregoing specification as indicating the scope of the invention.

I claim:

1. A steering wheel providing automotive anti-theft protection comprising:
   a. a lower section having a first end with releasable means housed therein and a second end with lockable means housed therein; and
   b. an upper section having a first end with means for receiving said releasable means and a second end with means for receiving said lockable means, said second end of said upper section further having means for capturing said second end of said lower section and also allowing rotation therebetween when said lockable means is not received by said second end of said upper section.

2. A steering wheel according to claim 1, wherein said releasable means comprises a bolt member having a pre-determined diameter and a stud, a biasing spring and an oblong opening in said first end of said lower section, said bolt member being arranged so as to ride on said biasing spring, said stud being arranged so as to outwardly protrude through said oblong opening and having dimensions selected so as to be capable of being grasped.

3. A steering wheel according to claim 2, wherein said means for receiving said releasable means comprises a cavity with dimensions slightly greater than said pre-determined diameter of said bolt member.

4. A steering wheel according to claim 1, wherein said means for capturing said second end of said lower section and for allowing for rotation comprises a retention plate having a head member affixed thereto, said head member having a pre-selected shape.

5. A steering wheel according to claim 4, wherein said lockable means comprises:
   a. a hollow having an inner wall and formed in said second end of said lower section;
   b. a locking shaft arranged so as to ride in said hollow and having an upper portion with sidewalls that define a cavity, said cavity selected to have dimensions so that it is capable of receiving said head member, said locking shaft also having a lower section with a pin attached thereto and which pin is arranged to ride in a channel in said lower section;
   c. a lockable device having a rotatable shaft which carries a cam member, said cam member having an opening therein through which said pin extends; and
   d. a spring member affixed to said rotatable shaft and having a hook on one end partially wrapped around said pin extending from the opening in said cam, said spring member having its other end braced against said inner wall of said hollow.

6. A steering wheel according to claim 5, wherein said sidewalls of said upper portion of said locking shaft and said pre-selected shape of said head member are selected to have complementary dimensions so as to provide both normal and rotated locked positions between said upper and lower sections of said steering wheel.

* * * * *